United States Patent [19]

Rimhagen

[11] 4,006,913
[45] Feb. 8, 1977

[54] LOW HEIGHT SEMI-TRAILER

[75] Inventor: Bengt Ingemar Rimhagen, Linkoping, Sweden

[73] Assignee: Linkoepings Transportindustri AB, Linkoeping, Sweden

[22] Filed: July 14, 1975

[21] Appl. No.: 595,375

[52] U.S. Cl. .................. 280/43.13; 280/43.23; 280/81 R; 280/104; 280/111; 280/43.12
[51] Int. Cl.² ........................................ B62D 21/02
[58] Field of Search .............. 280/81 R, 111, 43.13, 280/43.12, 43, 43.23, 80 R, 104

[56] References Cited

UNITED STATES PATENTS

| | | | |
|---|---|---|---|
| 1,088,983 | 3/1914 | Griffin | 280/81 R |
| 1,923,397 | 8/1933 | Robin | 280/81 R |
| 2,434,999 | 1/1948 | Griffin | 280/81 R |
| 2,919,928 | 1/1960 | Hoffer | 280/81 R |
| 3,544,127 | 12/1970 | Dobson | 280/43.23 X |
| R22,102 | 5/1942 | Reid | 280/81 R |

FOREIGN PATENTS OR APPLICATIONS

| | | | |
|---|---|---|---|
| 418,945 | 3/1947 | Italy | 280/80 R |
| 92,930 | 9/1958 | Norway | 280/81 R |

*Primary Examiner*—Joseph F. Peters
*Assistant Examiner*—John P. Silverstrim
*Attorney, Agent, or Firm*—IRA Milton Jones & Associates

[57] ABSTRACT

A semi-trailer has two multi-wheeled undercarriage assemblies, at opposite sides of its longitudinal centerline. Each comprises a first laterally extending beam medially pivotally connected to a longitudinally extending beam which can be raised or lowered relative to the trailer body, a pair of second beams, one transverse to each end of the first beam and each medially pivotally connected to the first beam, and at least one wheel rotatably mounted on each end of each second beam. The pivotal connections of the beams with one another and with the body enable all wheels to share equally in supporting the load.

7 Claims, 5 Drawing Figures

LOW HEIGHT SEMI-TRAILER

This invention relates generally to semi-trailers, and refers more particularly to a semi-trailer of low overall height having an undercarriage with numerous wheels, the undercarriage being so arranged that the several wheels all share equally in supporting the load of the trailer body and its contents so that none of the wheels is subjected to an excessive load force.

In certain types of cargo transporting work it is necessary to use a semi-trailer having a very low overall height. Such a vehicle may be needed, for example, in dockside operations, for the loading and unloading of package freighters, where the trailer must be run in beneath a palletized load or a container resting on a low frame, and must be capable of carrying the container at a level just high enough to keep it clear of the deck and not so high as to risk bringing it into collision with low overhead structure.

For a semi-trailer to have the least possible overall height, it must have small wheels. But a small wheel can support only a limited load, and therefore a semi-trailer that has small wheels and is intended for heavy cargo must have a large number of such wheels, all of which must share in the support of the load. It will be apparent that if a semi-trailer with numerous small wheels has rigid connections between its wheel axles and its body, it will be able to operate successfully only on relatively smooth, flat surfaces, inasmuch as any irregularity in the surface will throw the weight of the entire trailer and its cargo onto only one or a few wheels, overstressing and damaging them. It will also be apparent that a trailer undercarriage having numerous small wheels must not only be so arranged as to enable the wheels to share equally in supporting the load but must not, in itself, defeat the objective of achieving low overall height for the trailer.

With these considerations in mind, it is an object of the present invention to provide a trailer of the general type that has its front portion supportable by a towing vehicle to which it can be attached and has its rear portion supported on a wheeled undercarriage, which trailer has very low overall height and has numerous very small wheels but nevertheless imposes no excessive load on any of its wheels even when carrying a heavy cargo over a bumpy or irregular surface.

Another and more specific object of the invention is to provide a semi-trailer of low overall height having an undercarriage with a large number of wheels, which undercarriage enables all of the wheels to make constant contact with a surface over which the vehicle moves, and to share support of the load equally, even though the surface may be bumpy or irregular.

A further specific object of the invention is to provide a semi-trailer having a wheeled undercarriage that achieves the objects set forth above and having means by which its body can be readily raised and lowered relative to its wheels, so that the semi-trailer can be moved into position beneath a palletized load or a container that is supported on a low frame, with the trailer body in lowered condition, and the body can then be elevated relative to the wheels to supportingly engage the load for transport of it.

In general, the objects of the invention are achieved by means of a wheeled undercarriage for a semi-trailer that comprises two symmetrically disposed undercarriage assemblies, one at each side of the longitudinal centerline of the trailer, each such assembly comprising a first generally horizontal beam that is medially pivoted so that its ends can swing up and down about a first tilting axis, and a pair of second generally horizontal beams, each medially pivoted to an end portion of the first beam to be bodily carried up and down by tilting of the first beam and to have their end portions swingable about a second tilting axis that is common to both of the second beams and transverse to the first axis, one of said axes extending in the fore-and-aft direction of the vehicle, and each of said second beams having at least one wheel rotatably connected to each end thereof, the pivotal connections of said beams to the body and to one another enabling all of the wheels to maintain contact with a surface over which the trailer travels and to share equally in the support of the body and any cargo that it carries; and the arrangement being such that pivot axes can be so disposed above and below respective beams as to maintain low overall height of the vehicle.

The objects of the invention are further achieved by connecting the first beams to a rigid frame member which is in turn connected with the body by means of links that can swing between a near-horizontal body-lowered position and a more or less vertical body-raised position, and by means of extendable and retractable motor means connected between the body and said frame member to effect such swinging of the links.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 2 showing the semi-trailer in its body-raised condition and FIG. 3 showing it in its body-lowered condition;

Figure 3:
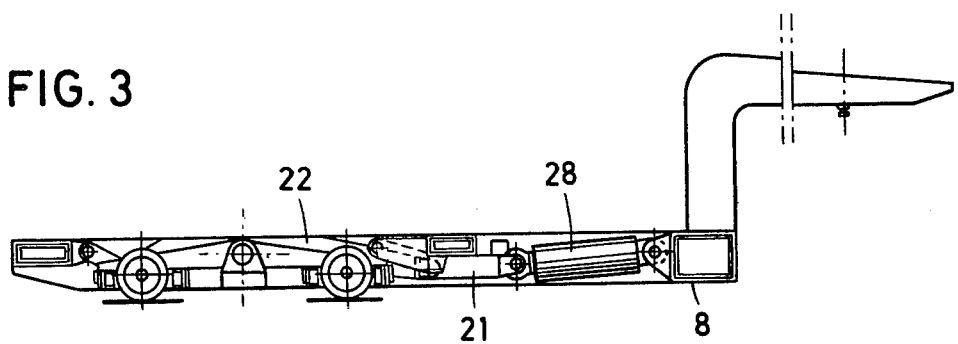
FIGS. 2 and 3 are longitudinal sectional views taken on the plane of the line II—II, III—III in FIG. 1.

Referring now to the accompanying drawings, the numeral 1 designates generally a semi-trailer embodying the principles of this invention, comprising, in general, a body 2 which is in the nature of a substantially rectangular load supporting frame and an undercarriage 9 having a large number of rather small wheels 11. The intended directions of motion of the vehicle are as denoted by the arrow 3 in FIG. 1. The wheeled undercarriage supports the rear portion of the semi-trailer while its front portion is supported by a towing vehicle (not shown) to which the semi-trailer can be detachably connected by means of a goose-neck tow bar 7 that extends forwardly and upwardly from the body 2.

The body of the particular semi-trailer here illustrated is intended to carry relatively large and heavy cargo containers 29, each of which can extend across the full width of the body; and for such loads the body can consist of a simple rectangular frame of box girders having transversely extending front and rear members 8 and 26, respectively, and longitudinally extending side members 32 and 33. A third or intermediate transversely extending box girder member 4, spaced from the front and rear members 8 and 26, affords rigidity to the body and provides for certain connections between the body and the wheels, as described below. Between the front body member 8 and the intermediate member 4, the body has a front opening or window 5; and it has a larger rear opening 6 between the intermediate member and the rear member 26. The tow bar 7 is of course rigidly connected to the front body member 8.

The wheeled undercarriage is located between the two side members 32, 33 and between the rear frame member 26 and the intermediate frame member 4. As shown, it comprises eight bogie units 10, each of which has two pairs of wheels 11, or a total of sixteen wheels. The several bogie units 10 are arranged in two undercarriage assemblies, one at each side of the longitudinal centerline of the trailer, and those assemblies are of course disposed symmetrically with respect to that centerline.

For each undercarriage assembly there is a center fore-and-aft extending supporting beam 22 which is confined to bodily up and down motion relative to the body 2, as described hereinafter, and which can be regarded as comprising a connection between the undercarriage assembly and the body.

Each undercarriage assembly comprises a main tilting beam 17 that extends transversely across the supporting beam 22, intermediate the ends thereof, and is medially pivotally connected with the supporting beam. The trunnion or pivot connection 19 between each main tilting beam 17 and its supporting beam 22 (best seen in FIG. 4) is preferably located at the underside of the supporting beam, and it allows the opposite ends of the main tilting beam to swing freely up and down about a fore-and-aft extending horizontal axis but otherwise confines the main tilting beam against motion relative to the main supporting beam.

Figure 1:
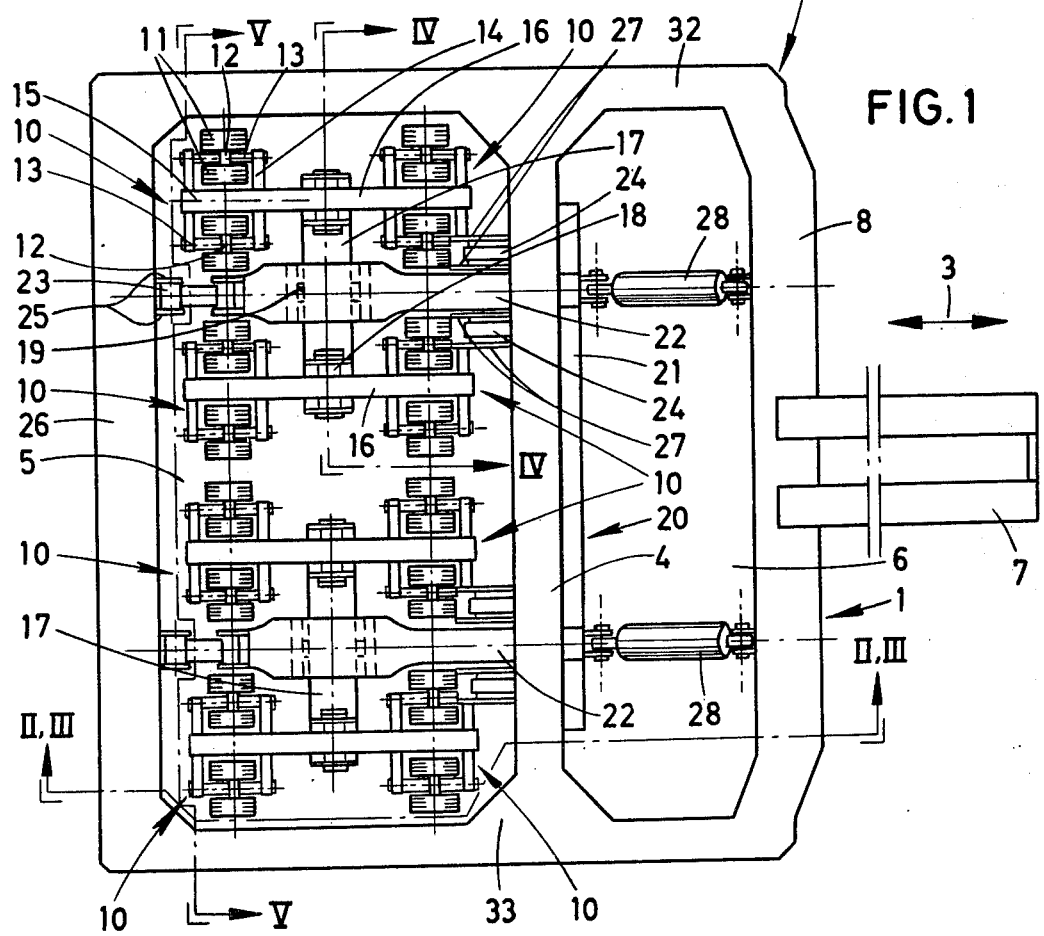
FIG. 1 is a top plan view of a semi-trailer embodying the principles of this invention.
Figure 4:
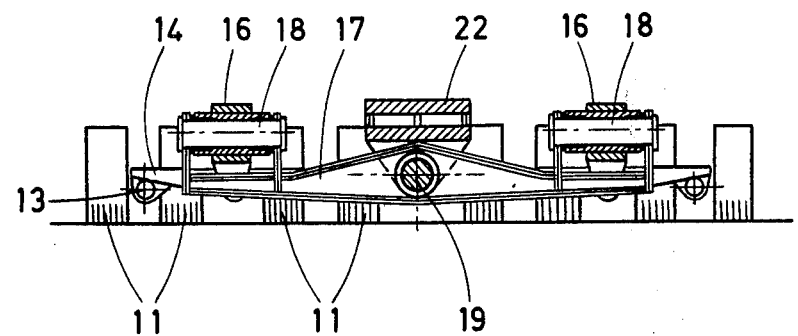
FIG. 4 is a transverse sectional view through one lateral half of the semi-trailer, taken on the plane of the line IV—IV in FIG. 1.

Across each end portion of each main tilting beam 17 there extends a longitudinal tilting beam 16. Each longitudinal tilting beam is medially pivotally connected with its main tilting beam, so that it moves bodily up and down with tilting motion of the main tilting beam but its opposite ends can swing up and down about an axis which extends lengthwise of the main tilting beam, that is, transversely of the trailer. The pivotal or trunnion connection 18 between each longitudinal tilting beam 16 and its main tilting beam 17 is at the upper side of the main tilting beam, as best seen in FIGS. 1 and 4, so that the longitudinal tilting beams are at about the level of the supporting beams 22.

A pair of bogie beams 14 extend across each end portion of each longitudinal tilting beam 16. The two bogie beams of each pair are spaced from one another lengthwise of the longitudinal tilting beam, with one bogie beam of the pair near the very end of the longitudinal tilting beam and the other about midway between the end of the longitudinal tilting beam and its trunnion connection 18. The distance between the two bogie beams of each pair is thus somewhat greater than the diameter of a wheel. The bogie beams of course extend transversely of the trailer, and each has a medial pivotal connection to its longitudinal tilting beam. The trunnion or pivot connection 15 between each bogie beam and its longitudinal tilting beam is at the underside of the latter and extends lengthwise thereof. Note that the bogie beams are thus at about the level of the main tilting beams 17. The four bogie beams connected with each longitudinal tilting beam 16 swing about coinciding axes. Each pair of bogie beams has connections with two pairs of wheels and thus comprises a part of one of the bogie units.

Each pair of bogie beams cooperates to support a pair of rock shafts 13, each such rock shaft being connected with the adjacent ends of the bogie beams of its pair and extending longitudinally between them. The rock shafts are confined to rotation about their own axes relative to the bogie beams, and therefore the two rock shafts that are connected with each pair of bogie beams constrain those bogie beams to tilt in unison about their coaxial trunnions 15. It will be apparent that each rock shaft is in the nature of a longitudinally extending beam that is rotatable about its own longitudinal centerline.

The wheels are arranged in pairs, with each pair mounted for rotation on opposite end portions of a relatively short axle member 12. Each axle member is in turn medially secured to one of the rock shafts 13, with the axle member midway between the two bogie beams 14 that support the rock shaft and with the axis of the two wheels transverse to that of the rock shaft and with the wheels of the pair disposed at opposite sides of the rock shaft. In this case, since the rock shafts are rotatable relative to the bogie beams that carry them, each axle member can be rigidly secured to its rock shaft and the rotatable mounting of the rock shafts relative to the bogie beams will provide for up and down tilting of the axle members about their midpoints. Obviously the same results could be obtained if the rock shafts were replaced by beam members rigidly connected to their respective bogie beams and the axle members were medially pivotally connected to their respective beam members. However, with rock shafts 13 that are journalled in the bogie beams as shown, the rigid connection of each axle member 12 to its rock shaft can be either at the upper side of the rock shaft or at the bottom thereof, depending upon the arrangement that obtains the least distance between the wheel axes and the top surface of the trailer body 2.

It will be evident that by reason of the above described pivotal connections of the several beams to one another and to the trailer body 2, every one of the wheels 11 can maintain contact with a surface over which the trailer travels, notwithstanding bumps or irregularities in that surface, and every wheel will always carry its proportionate share of the load of the trailer and its cargo, so that no wheel will ever be overloaded.

Figure 5:
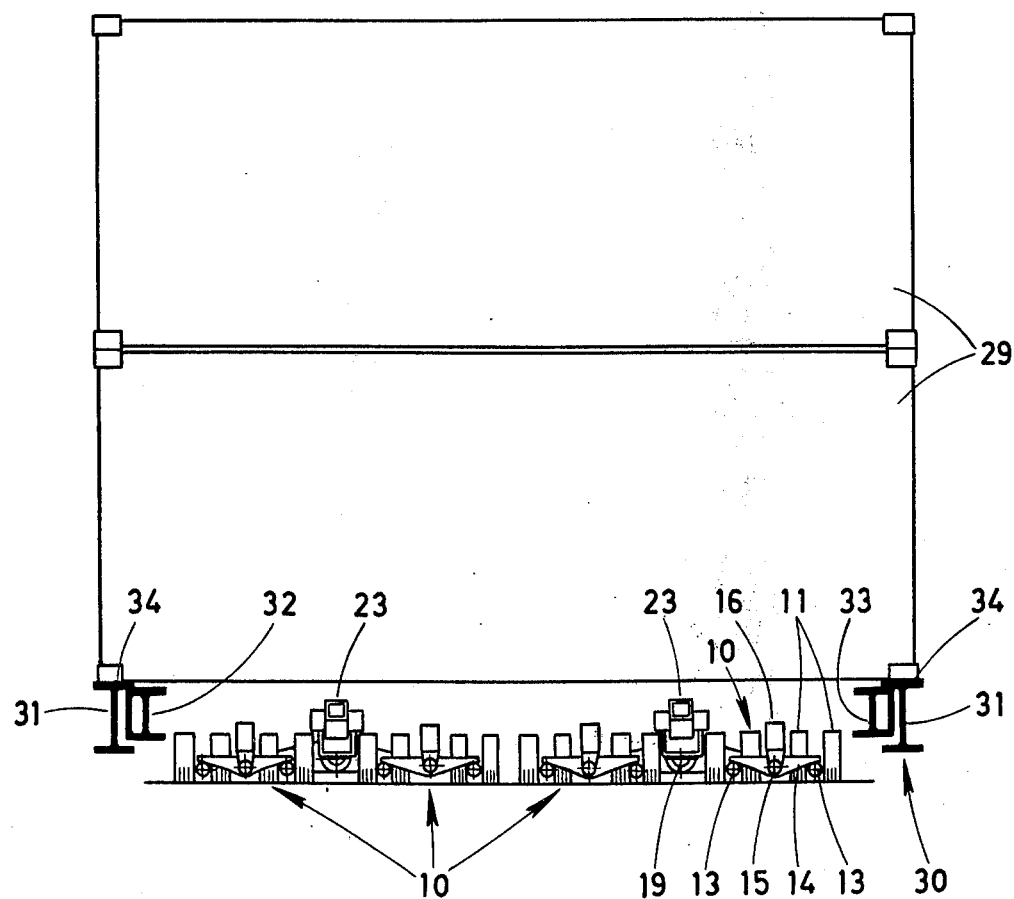
FIG. 5 is a transverse sectional view taken on the plane of the line V—V in FIG. 1.

To enable the trailer to be used with palletized loads, its body 2 is arranged to be raised and lowered through a limited distance relative to the wheeled undercarriage. As an example of one form of palletized load, FIG. 5 shows stacked large cargo containers 29 that are stored on low supports comprising a pair of parallel sills 31 which are spaced apart by a distance slightly less than the width of a container. With the trailer body in lowered condition, it is run in between the sills and under the containers resting on them. The body is then raised to its elevated position, thereby lifting the containers off of the sills and causing them to be supported solely by the trailer, so that they can be transported by it to a new location.

Each of the main supporting beams 22 of the semi-trailer comprises one leg of a generally U-shaped rigid frame 20 that also includes a transversely extending bight member 21 to which the beams 22 are rigidly attached at their forward ends. At its rear end each of the longitudinally extending supporting beams is bifurcated, and a heavy link 23 is received between the bifurcations and has its lower end swingably connected to them. At its upper end each of the links 23 has a swinging connection to brackets 25 that are fixed on the rear body member 26 and project a short distance forwardly from it.

Near its front end each of the longitudinal supporting beams 22 is similarly connected with the body 2 by links 24. There is a link 24 on each side of each supporting beam 22, and the lower ends of those links are swingably connected to the supporting beams while their upper ends are pivotally connected to brackets 27 that project a short distance rearwardly from the intermediate body member 4. The pivot axes of all of the links 23 and 24 extend transversely of the body so that those links swing in vertical fore-and-aft extending planes.

Figure 2:
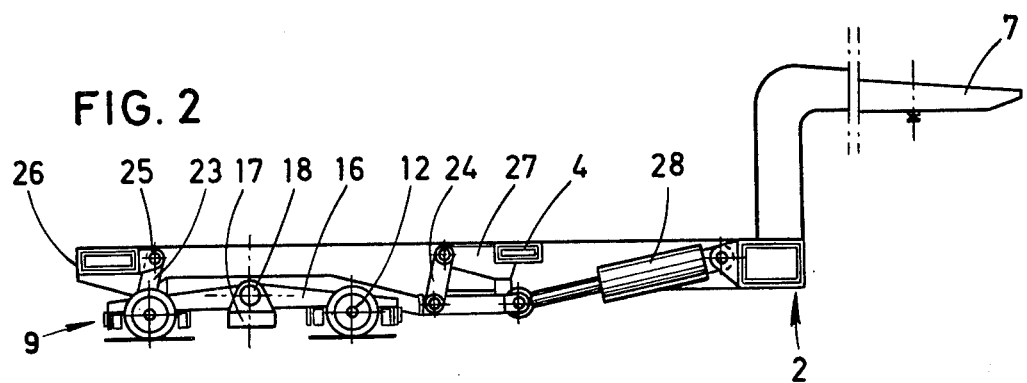

A pair of double acting hydraulic cylinder mechanisms 28 are connected between the front body member 8 and the transverse member 21 that forms the bight of the U-shaped frame 20. When those hydraulic motors are retracted, the body 2 is in its lowered condition shown in FIG. 3, and the several links are in near-horizontal orientations but extend obliquely rearwardly and slightly upwardly from their pivoted lower ends. As shown in FIG. 2, extension of the hydraulic motors 28 causes the body 2 to move forwardly relative to the U-shaped frame 20, swinging the upper ends of the links forwardly and upwardly and thus raising the body 2 relative to the frame 20 that carries the undercarriage assemblies. The links swing to defined positions a little past the vertical so that the body is locked in its raised position without the need for maintaining extending force upon the hydraulic motors 28.

The body is of course lowered by retracting the hydraulic motors. Note that when the body is in lowered position the upper portions of the wheels are received in the large rear opening 5 in the body 2 so that the upper surface of the body is at a level only slightly above that of the tops of the wheels. Wheel diameter is thus the dimension that substantially controls the overall height of a semi-trailer of this invention.

From the foregoing description taken with the accompanying drawings it will be apparent that this invention provides an undercarriage for a semi-trailer whereby the vehicle can be equipped with numerous very small wheels, to enable it to have a low overall height, and whereby assurance is had that all of the wheels will share equally in supporting the load of the trailer and its cargo. It will also be apparent that the semi-trailer of this invention has simple means for raising and lowering its body to enable it to lift and carry palletized loads.

Those skilled in the art will appreciate that the invention can be embodied in forms other than as herein disclosed for purposes of illustration.

The invention is defined by the following claims.

I claim:

1. An undercarriage which supports the body of a vehicle such as a trailer and which has numerous wheels that share equally in the support of the body and any load thereon notwithstanding irregularities in the surface over which the vehicle may be moving, said undercarriage comprising
    a pair of undercarriage assemblies symmetrically disposed at opposite sides of a longitudinal centerline of the vehicle and each characterized by:
    A. a laterally extending first beam;
    B. first trunnion means medially pivotally connecting said first beam with the vehicle body and enabling the opposite ends of the first beam to be swingable up and down about a longitudinally extending tilting axis;
    C. a pair of second beams which extend longitudinally;
    D. second trunnion means medially pivotally connecting said second beams, respectively, with opposite end portions of the first beam so that the second beams are carried bodily up and down by tilting motion of the first beam but the opposite end portions of said second beams are swingable up and down about the first beam and around a common laterally extending second tilting axis;
    E. two pairs of laterally extending bogie beams for each of said second beams;
    F. third trunnion means medially pivotally connecting each bogie beam with its second beam and disposing one bogie beam of each pair near an end of its second beam and the other bogie beam of the pair between said one bogie beam and said second tilting axis, said third trunnion means confining all of the bogie beams for each second beam to tilting about a longitudinally extending third tilting axis;
    G. two pairs of wheels for each pair of bogie beams;
    H. an axle for each pair of wheels by which the wheels of the pair are constrained to rotate about a common axis and are maintained axially spaced apart by a fixed distance; and
    I. means providing a connection between each axle and a pair of adjacent end portions of its pair of bogie beams, whereby the axle is carried by said bogie beams between their said end portions, the pair of bogie beams is constrained to swing in unison about said third tilting axis, and the axle is confined to an orientation in which its axis extends laterally and is tiltable about an axis intermediate its ends, the last mentioned means comprising a rigid longitudinally extending member connected at its ends with said end portions of said pair of bogie beams and which has a medial connection with said medial portion of said axle.

2. The undercarriage of claim 1 wherein each of said rigid longitudinally extending members comprises a rock shaft that has its ends rotatably connected with its bogie beams and has a rigid connection with its axle.

3. The undercarriage of claim 1, further characterized by means connecting said undercarriage assemblies with one another and with the vehicle body in a manner that provides for raising and lowering the vehicle body relative to the wheels, the last mentioned means comprising:
    1. a substantially rigid frame having substantial longitudinal extent and having substantial lateral extent symmetrically to the longitudinal centerline of the body, said first trunnion means providing a connection between each of said first beams and said frame;

2. a plurality of links, each having one end pivotally connected to the vehicle body and its other end pivotally connected to said rigid frame,
   a. certain of said links being disposed near the front of the vehicle body,
   b. others being disposed near the rear thereof, and
   c. said links being disposed substantially symmetrically to opposite sides of the longitudinal centerline of the vehicle,
   d. each of said links being swingable in a vertical fore-and-aft extending plane between a near-horizontal position in which the vehicle body is lowered relative to the wheels, through and slightly beyond a vertical position to a defined body-raised position; and 3. extendable and retractable actuator means connected between the vehicle body and said rigid frame for so moving the body relative to the frame as to swing the links between their said near-horizontal positions and their said body-raised positions.

4. The undercarriage of claim 1 wherein said second trunnion means are at the same vertical side of said first beam as said first trunnion means.

5. The undercarriage of claim 1 wherein
   1. said first and second trunnion means are at the upper side of said first beam, and
   2. said second and third trunnion means are at the lower side of said second beam.

6. A wheeled undercarriage for a vehicle, such as a trailer, that has low overall height, the wheels of said undercarriage being of small diameter and being numerous to afford adequate support for the vehicle and its cargo without excessively loading any one wheel, said undercarriage comprising:
   A. a pair of main tilting beams that extend transversely of the vehicle body;
   B. means comprising first trunnion means medially pivotally connecting each of the main tilting beams with the vehicle body and confining each of said beams to up and down swinging motion of its opposite ends about a fore-and-aft extending axis which is above the beam, said first trunnion means for the respective main tilting beams being spaced symmetrically to opposite sides of the fore-and-aft extending centerline of the body, and the main tilting beams being substantially in lengthwise alignment with one another;
   C. a pair of fore-and-aft extending second beams for each of said main tilting beams;
   D. second trunnion means medially pivotally connecting the second beams of each pair thereof with the opposite ends of their respective main tilting beams and confining the second beams of each pair to swinging motion about coinciding axes that extend lengthwise parallel to their main tilting beam and lie above the latter and below the second beams;
   E. a pair of transversely extending bogie beams for each end of each of said second beams;
   F. third trunnion means medially pivotally connecting each bogie beam with its second beam and confining all of the bogie beams for each second beam to tilt about their second beam and around a common axis which extends lengthwise parallel to said second beam and lies below it and above said bogie beams, said third trunnion means disposing one bogie beam of each pair near an end of its second beam and the other bogie beam of the pair between said one bogie beam and the second trunnion means;
   G. a pair of fore-and-aft extending rock shafts for each pair of bogie beams, each rock shaft having its end portions rotatably secured in end portions of its bogie beams that are at one side of a second beam; and
   H. an axle member for each rock shaft, each axle member being medially secured to its rock shaft, intermediate the ends of the latter and extending transversely thereto, and each axle member having a wheel rotatably mounted on each end thereof so that the wheels on each axle member are at opposite sides of its rock shaft, rotation of each rock shaft in its bogie beams providing for tilting of its axle member relative to the bogie beams by which the rock shaft is carried.

7. The wheeled undercarriage of claim 6 wherein said means connecting each of the main tilting beams with the body comprises:
   1. a rigid frame to which said first trunnion means are connected;
   2. a plurality of links, each having at its opposite ends pivotal connections to said frame and to the body, respectively, each of said links being swingable in a fore-and-aft extending vertical plane between a near-horizontal body-lowered position and a near-vertical body-raised position; and
   3. said undercarriage being further characterized by reversible motor means connected to react between the body and said rigid frame for swinging the links between their said positions.

* * * * *